US011507864B2

(12) United States Patent
Zabihi et al.

(10) Patent No.: US 11,507,864 B2
(45) Date of Patent: Nov. 22, 2022

(54) COMPUTERIZED METHOD OF TRAINING A COMPUTER EXECUTED MODEL FOR RECOGNIZING NUMERICAL QUANTITIES

(71) Applicant: KIRA INC., Toronto (CA)

(72) Inventors: Jamal Zabihi, Toronto (CA); Alexander Karl Hudek, Toronto (CA)

(73) Assignees: Kira Inc., Toronto (CA); Zuva Inc., Toronto (CA)

( * ) Notice: Subject to any disclaimer, the term of this patent is extended or adjusted under 35 U.S.C. 154(b) by 361 days.

(21) Appl. No.: 16/883,183

(22) Filed: May 26, 2020

(65) Prior Publication Data
US 2021/0374559 A1 Dec. 2, 2021

(51) Int. Cl.
*G06F 7/00* (2006.01)
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ........... G06F 16/90344; G06F 16/9038; G06F 16/285; G06F 16/283; G06F 16/24526; G06F 16/24556; G06F 16/2433; G06F 40/30; G06F 40/56; G06F 40/274; G06F 40/268; G06F 40/289; G06N 5/04; G06N 20/00; G06N 20/20
See application file for complete search history.

(56) References Cited

U.S. PATENT DOCUMENTS

2005/0198027 A1 * 9/2005 Hamaguchi ............. G06F 16/93
707/999.005
2014/0236941 A1 * 8/2014 Johns .................. G06F 16/9566
707/730
2021/0374559 A1 * 12/2021 Zabihi ..................... G06F 40/30

* cited by examiner

*Primary Examiner* — Mohammad A Sana
(74) *Attorney, Agent, or Firm* — Elan IP Inc.

(57) ABSTRACT

A computerized method for training a computer executed model for recognizing numerical quantities is provided. An input, atleast one unit expression, is received by an input module. The input module may then search for numeric values and the unit expression in a text corpus, wherein, the text corpus comprises sets of words and frequency of occurrence of each of the sets. The input module may identify identified sets, wherein the identified sets may comprise a combination of a numeric value and the unit expression. A synthetic text generation module may then generate sentences from the text corpus by applying the identified sets as input. A training dataset may be generated by a labeling module by auto labelling features in the generated sentences based on the numeric value and the unit expression and further a training module may train the training model by providing input based on the training dataset.

14 Claims, 4 Drawing Sheets

COMPUTERIZED METHOD OF TRAINING A COMPUTER EXECUTED MODEL FOR RECOGNIZING NUMERICAL QUANTITIES

BACKGROUND

Unless otherwise indicated herein, the materials described in this section are not prior art to the claims in this application and are not admitted to being prior art by inclusion in this section.

FIELD

The subject matter in general relates to entity recognition systems. More particularly, but not exclusively, the subject matter is directed to training of entity recognition systems for recognizing numerical quantities.

DISCUSSION OF RELATED ART

Information extraction techniques are designed to automatically extract and classify useful information from documents. The useful information may be name of organizations, places, dates and so on. Information extraction techniques may include name identifiers, event identifier, numeric expression identifiers and so on among many others. Numeric expression identifiers may be trained to identify the numeric characters in the document. Rule based approaches, feature based supervised learning approach and deep learning approach, among many others, are some of the techniques that have been successfully developed in recognizing and classifying numeric expression from a given document.

In rule-based approaches, hand crated rules and pattern matching techniques are designed by using domain specific dictionaries, gazetteers, and syntactic lexical patterns. Named entities, such as products, organizations and so on, are identified and classified using these handcrafted rules and the pattern matching techniques. Since the rule-based approach utilize the domain specific rules to classify the named entities, a significant amount of manual work is required to generalize the rule-based approach.

In feature-based supervised learning approach, features are extracted from a large training dataset containing multiple classification labels for different types of data points. The extracted features are then fed to plurality of machine learning algorithms to train a training model to identify features. The training dataset of the feature-based supervised learning approach is generated manually, which may be time consuming and expensive.

Moving on, the deep-learning approach comprises of plurality of neural network layers, wherein the neural network layers may be trained to identify and classify entities. Deep-learning approach also requires a significant amount of training data to train the neural network layers.

To train the above mentioned conventional systems, a large amount of annotated (labelled) data may be required in the training phase. For annotating or labelling the data, a large number of raw or unlabelled documents, such as text documents, may be collected from various sources. A human annotator may then label a corpus of text in the collected documents. As an example, the human annotator may label a monetary unit and value as 'currency'. The labelled data may be then fed to a machine learning training algorithm, wherein the algorithm may be trained on the labelled dataset and may provide the desired output. Manual data annotation may be time consuming and expensive, and moreover, building a corpus of documents is also a challenging task.

In light of the foregoing discussion, there may be a need for an improved technique for training machine learning models, and more specifically training machine learning models for recognizing numerical quantities.

SUMMARY

In one aspect, a computerized method for training a computer executed model for recognizing numerical quantities is provided. The method comprises, an input module receiving atleast one unit expression as input. The input module may then search for numeric values and the unit expression in a text corpus. The text corpus may comprise sets of words and frequency of occurrence of each of the sets. The input module may identify sets which may comprise a combination of a numeric value and the unit expression. A synthetic text generation module may then generate sentences from the text corpus by applying the identified sets as input. A training dataset may be generated by the labeling module by auto labelling features in the generated sentences based on the numeric value and the unit expression. A training module may train the model by providing input based on the training dataset.

In the aspect, a computerized system for training a computer executed model for recognizing numerical quantities is provided. The system comprises one or more processors, wherein the one or more processors may be configured to receive, as input, atleast one unit expression, search for numeric values and the unit expression in a text corpus, generate sentences from the text corpus by applying the identified sets as input, generate a training dataset by auto labelling in the generated sentences based on the numeric value and the unit expression and train the model by providing input based on the training dataset. The text corpus may comprise sets of words and frequency of occurrence of each of the sets.

BRIEF DESCRIPTION OF DIAGRAMS

This disclosure is illustrated by way of example and not limitation in the accompanying figures. Elements illustrated in the figures are not necessarily drawn to scale, in which like references indicate similar elements and in which.

DETAILED DESCRIPTION

The following detailed description includes references to the accompanying drawings, which form part of the detailed description. The drawings show illustrations in accordance with example embodiments. These example embodiments are described in enough detail to enable those skilled in the art to practice the present subject matter. However, it may be apparent to one with ordinary skill in the art that the present invention may be practised without these specific details. In other instances, well-known methods, procedures and components have not been described in detail so as not to unnecessarily obscure aspects of the embodiments. The embodiments can be combined, other embodiments can be utilized, or structural and logical changes can be made without departing from the scope of the invention. The following detailed description is, therefore, not to be taken in a limiting sense.

In this document, the terms "a" or "an" are used, as is common in patent documents, to include one or more than one. In this document, the term "or" is used to refer to a non-exclusive "or", such that "A or B" includes "A but not B", "B but not A", and "A and B", unless otherwise indicated.

Figure 1:
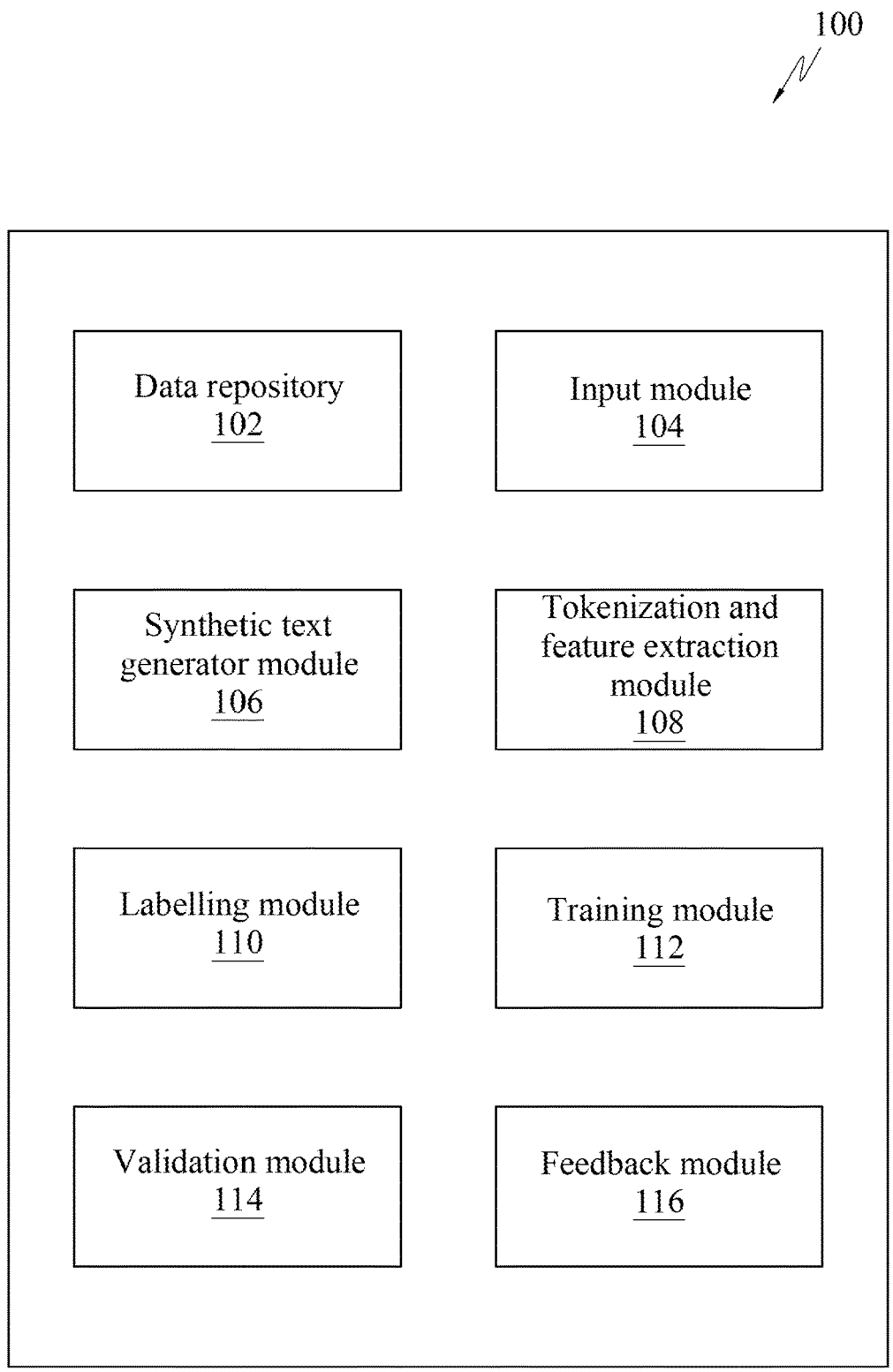
FIG. 1 is an exemplary block diagram illustrating software modules of a system 100 for classifying and identifying numerical quantities, in accordance with an embodiment.

Referring to the figures, and more particularly to FIG. 1, a system and method for training a computer executed model for recognizing numerical qualities is provided, in accordance with an embodiment. The system 100 may be trained to identify and classify numerical quantities from a document. In an embodiment, the documents may include invoices, receipt, records, bank statements, image documents, among others. The system 100 may be trained on a dataset, wherein the dataset comprises of synthetic documents wherein, the synthetic documents may be generated programmatically.

In an embodiment, for identifying and classifying numerical quantities from the document, the system 100 may be configured to comprise a data repository 102, an input module 104, a synthetic text generator module 106, a tokenization and feature extraction module 108, labelling module 110, a training module 112, a validation module 114 and a feedback module 116.

In an embodiment, the data repository 102 may comprise of plurality of text corpora. The text corpora represent a collection of (data) texts in plurality of languages. That is to say, the data repository may comprise text corpora in plurality of languages. Each of the text corpus may comprise bigrams of the words, with frequency of each bigram. The frequency of any bigram may be the number of the times the bigram is repeated in the text corpus. Such a text corpora may be obtained from CRUBADAN PROJECT.

In another embodiment, each of the text corpus may comprise n-grams with the frequency of each n-grams.

In the embodiment, the input module 104 may receive an input to generate synthetic documents that may be used to train a model. Synthetic documents may be documents generated programmatically. The input received by the input module 104 may be one or more unit expression. The unit expression may be measure of quantities such as length, weight or currency, among others. As an example, the length units may be meter (m), centimetre (cm), kilometre (km) and so on. Likewise, monetary units (currency) may be dollar, euro or yen, or their symbols.

The input module 104, on receiving the input may search for a combination of the input unit expression and a numeric value in the text corpus, which may comprise a list of bigrams. As an example, if the input is "dollar", "$" and "USD", the input module 104 may search for a match, wherein the match may be unit dollar along with a numeric value. As an example, the match (identified set) may include 5 dollar, 100 dollar, $25, 500 USD and so on.

In the embodiment, the synthetic text generator module 106 may generate synthetic documents. The synthetic text generator module 102 may receive the plurality of identified sets from the input module 104 as input and may search for the preceding and the following words of each of the identified sets from the text corpus. On finding the preceding bigram set and following bigram set, the text generator module 106 may generate sentences based on the frequencies of the occurrence of the preceding bigram set and following bigram set. The process may be repeated for each of the newly found preceding and following words. As an example, if the identified set received from the input module 104 is '5 dollars', then the synthetic text generator module 106 may search for words before '5' and words after 'dollars' and their frequency in the text corpus. The bigram 'of 5' may have frequency 50 and the bigram 'number 5' may have a frequency 40. Similarly, the bigram 'dollars has' may have frequency 20 and the bigram 'dollars currency' may have a frequency 10. The synthetic text generator module 106 on evaluating the frequencies and the bigrams may start generating a first sentence using the bigrams 'of 5' and 'dollars has'. The synthetic text generator module 106 may then search for words before 'of' and after 'has'. By repeating the above described process, the synthetic text generator module 106 may generate a sentence, 'The banknote of 5 dollars has the image of Abraham Lincoln'. The next set of sentences may be generated using the less frequency bigrams. By repeating the whole process, the synthetic text generator module 106 may generate plurality of synthetic sentences using plurality of identified sets as inputs. Plurality of synthetic sentences may form a synthetic document.

In an embodiment, the synthetic text generator module 106 may be configured to preset a maximum number of words 'n' per sentence. That is to say, the number of words per sentence generated by the synthetic text generator module 106 may be 'n' or less than 'n'. As an example, let the identified set received from the input module 104 be '$ 9,700,000'. The synthetic text generator module 106 may search for words before '$' and after '9,700,000'. If the set of bigrams after '9,700,000' are (9,700,000.00 representing), (representing at), (at this), (this agreement) and the set of bigrams before '$' are (exceeds $), (obligations exceeds), (secure obligations), (in secure), (embodied in), (not embodied), (costs not), (indirect costs) and the number of maximum preset words n=15, then the synthetic text generator module 106 may generate a sentence, 'indirect costs not embodied in secure obligations exceeds $9,700,000.00 representing at this agreement'.

In an embodiment, the plurality of sentences generated from a single identified set may form a single document. Similarly, plurality of sentences generated from another identified set may form a second document and so on.

In an embodiment, the labelling module 110 may receive the synthetic documents for labelling. The labelling module 110 may also receive the identified set as input. The labelling module 110 uses the identified sets to label the identified sets in the systematic documents, thereby generating auto labelled synthetic documents, which may be used as training dataset.

As an example, if the input to the input module 104 is 'dollar', then the identified sets in the synthetic documents, such as 5 dollar, 100 dollar and so on, may be labelled by the labelling module 110 as 'US currency value'. In yet another example, if the input to the input module 104 is 'km', then the identified sets (e.g. 15 km, 68 km and so on) may be labelled as 'length measurement'. The labelling module 110 may label the combination of the unit expression and the numeric values as one label. The labelled features may form the training dataset for training a model to successfully identify and classify the numerical quantities.

In an embodiment, the tokenization and feature extraction module 108 may be configured to tokenize the synthetic sentences generated by the synthetic text generator module 106 into n-grams and extract n-gram features from the tokenized sentences. The tokenization and feature extraction module 108 may tokenize the synthetic sentences using, as an example, PUNKT algorithm. Further, during the n-gram feature extraction of the tokenized synthetic sentences, the tokenization and feature extraction module 108 may encode the tokenized sentences to unique vectors. These vectors may be then fed to the training algorithm as inputs.

As an example, let the input to the tokenization and feature extraction module 108 be 'indirect costs not embodied in secure obligations exceeds $9,700,000.00 representing at this agreement. utility service delivery to the whole agreement is registered as compensation payable hereunder. (j) us $43.8 million then generally accepted'. The tokenization and feature extraction module 108 may first segment the sentences into 2 segments: 'indirect costs not embodied in secure obligations exceeds $9,700,000.00 representing at this agreement' and 'utility service delivery to the whole agreement is registered as compensation payable hereunder. (j) us $43.8 million then generally accepted.' The tokenization and feature extraction module 108 may then extract features from the tokenized sentences, wherein each of the encoded tokenized words may be represented as indirect: 2453731, costs: 2022742, not: 360710, embodied: 45905, in: 1221451 and so on. These encoded vectors may then be fed to the training algorithm.

In an embodiment, the training module 112 may train a model by feeding the training dataset to a training algorithm. The model may learn from the training labelled dataset to identify and classify the numerical quantities.

In an embodiment, the validation module 114 may comprise a plurality of validation dataset for evaluation of the trained model. The validation dataset may comprise real documents and sentences, wherein, the unit expressions and the corresponding numerical values may be manually labelled.

The validation module 114 may feed the trained model with the validation dataset to receive labelled validation dataset from the trained model.

In an embodiment, the feedback module 116 may predict the probability value with which the trained model may correctly identify and classify the numerical quantities, based on the outcome of the model labelling the validation dataset. If the probability value is less than an acceptable value, then a feedback may be communicated to the training module 112. Further, the feedback may also be communicated to the synthetic text generator module 106 to alter the synthetic documents for the training model to train upon. As an example, if the model was not able to label the dollar value correctly as 'US currency value', then the feedback module 108 may send the feedback to the synthetic text generator module 106 so that the synthetic text generator module 106 may generate more number of synthetic documents including the dollar values.

In an embodiment, the feedback communicated from the feedback module 116 may not be completely automated. That is to say, human operators may study the output from the training model and may adjust learning parameters, features and/or volume of synthetic training data based on the output from the training model.

Having discussed about the various modules of system 100, the steps involved in generating synthetic documents are discussed hereunder.

Figure 2:
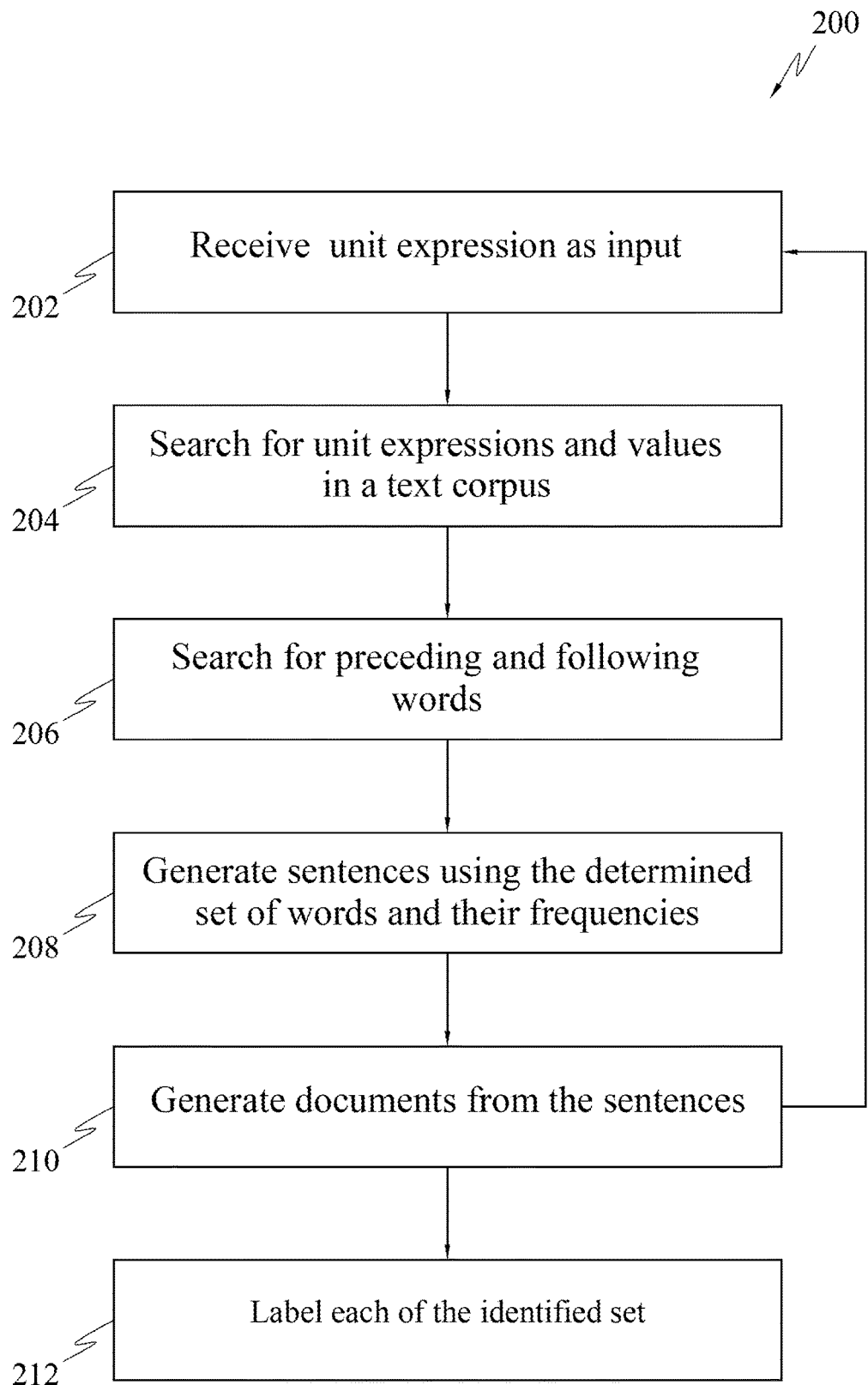
FIG. 2 is a flowchart 200 illustrating the steps involved in generating synthetic documents, in accordance with an embodiment.

In an embodiment, referring to FIG. 2, at step 202, the input module 104 may receive unit expression as the input. As an example, the unit expression may be 'dollar'. At step 204, the input module 104 may search for the combination of the unit expression and the corresponding numeric values in the text corpus stored in the data repository 102.

On identifying the combination of the unit expression and the corresponding numeric values (identified sets), at step 206, the synthetic text generator module 106 may search for words before and after the identified words in the text corpus. As an example, if one of the identified words is '100 dollar', then the synthetic text generator module 106 may first search for words before '100' and after 'dollars'. Then depending on the frequency of the occurrence of the bigrams of words before and after the identified set, the synthetic text generator module 106 may initiate the generation of synthetic sentences (step 208). On identifying the words before and after the identified sets, the synthetic text generator module 106 may again search for the bigrams of words before and after the newly identified words. As an example, if the newly identified word before '100' is 'a' and the word after 'dollar' is 'check', the synthetic text generator module 106 may search for bigrams of words before 'a' and after 'check'. Depending on the frequency of occurrence, the synthetic text generator module 106 may continue with the generation of synthetic sentences. By repeating the process described above, the synthetic text generator module 106 may generate synthetic text.

At step 210, the synthetic text generated by the synthetic text generator module 106 may be combined together to form the synthetic documents. The process (steps 202-210) may be repeated for generating more documents by receiving more inputs. At step 212, the labelling module 110 may label each of the identified set. As an example, '100 dollars' may be labelled by the labelling module 110 as 'US currency value'.

By repeating the process (steps 202-210), a huge dataset may be created for training the system 100 for identifying and classifying the numerical quantities. The dataset may include plurality of automatically labelled combination of numerical quantities and unit expressions.

Having discussed the steps involved in generating synthetic documents, the steps involved in training the training model is discussed hereunder.

Figure 3:
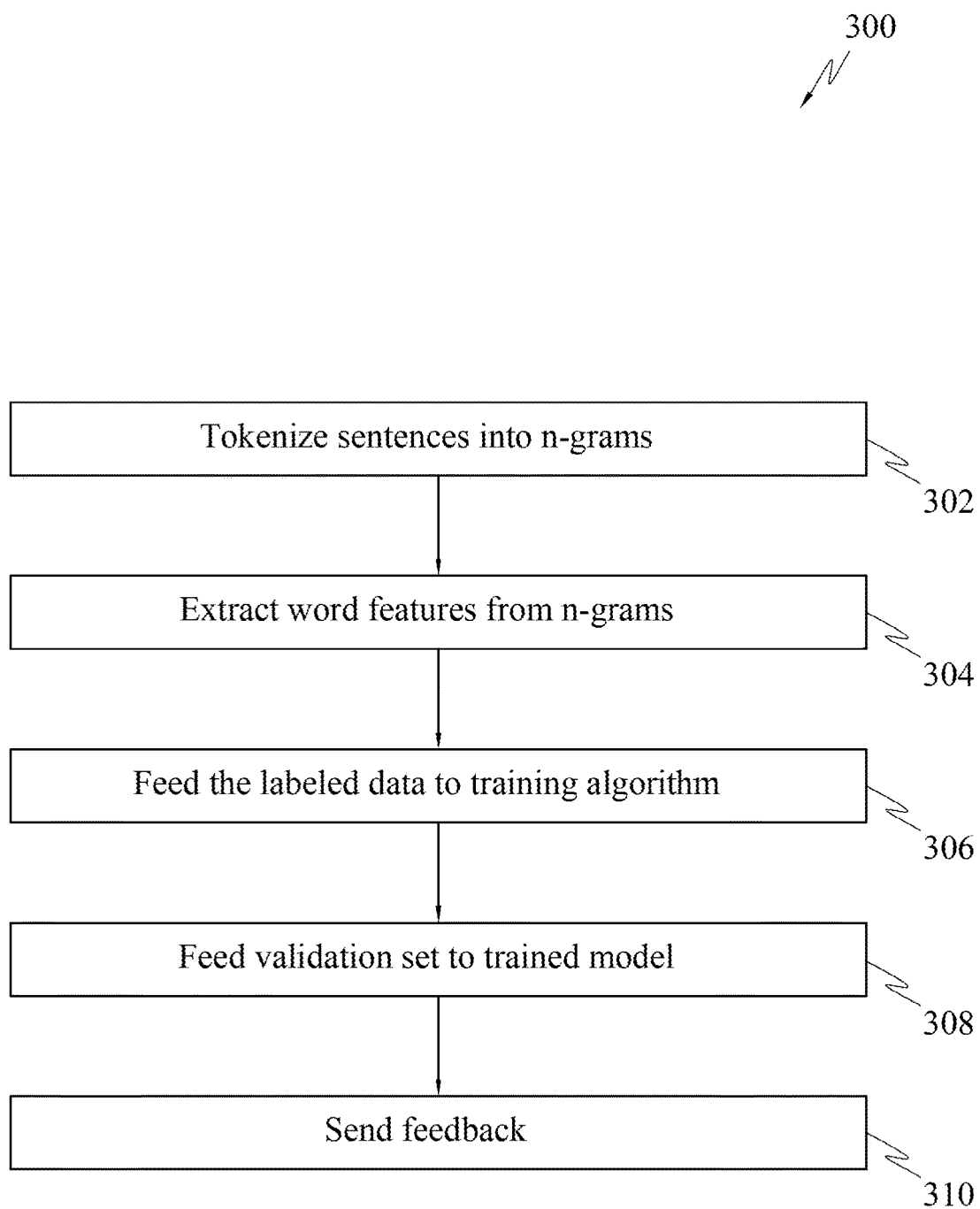
FIG. 3 is a flowchart 300 illustrating the steps involved in training a training model using programmatically labelled training data, in accordance with an embodiment.

Referring to FIG. 3, at step 302, the synthetic labelled documents may be fed to the tokenization and feature extraction module 108, wherein the synthetic labelled documents may be tokenized into n-gram tokens and at step 304, the tokenization and feature extraction module 108 may extract word features from each of the n-grams tokens.

At step 306, each of the extracted sequence of word features may be fed to the training model (training algorithm), wherein the model may learn to identify and classify the numerical quantities. The model or algorithm may be, but not limited to, a Conditional Random Field (CRF) model. The model may learn to identify and classify the numerical quantities by studying the labelled features of the synthetic documents.

At step 308, the validation set may be fed to the model, wherein the model may identify and classify the numerical quantities. At step 310, the feedback module 116 may send a negative feedback or a positive feedback to the training module 112. If the output of the trained model is false negative (trained model did not label the numerical quantity correctly), then the feedback loop may feed a negative feedback to the training module 112. Further, if the output of the trained model is true positive (trained model labelled the numerical quantity correctly), then the feedback loop may feed a positive feedback to the training module 112. Further, the feedback module may also provide feedback to the synthetic text generator module 108.

Once the training is completed, the trained model may be introduced in any computing device, wherein, the trained model may identify and classify the numerical values from real documents.

Figure 4:
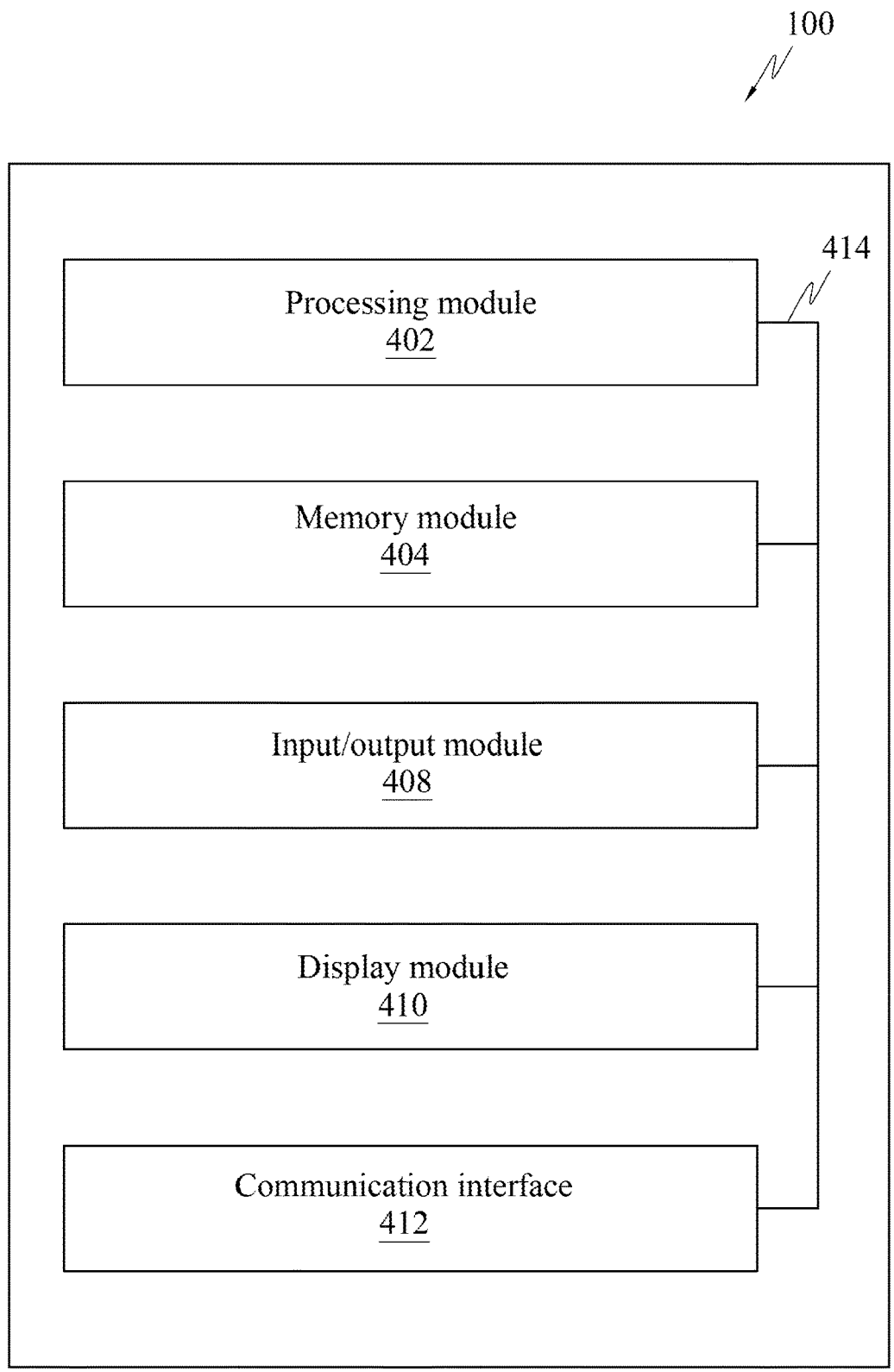
FIG. 4 is a block diagram illustrating hardware elements of the system 100 of FIG. 1, in accordance with an embodiment.

FIG. 4 is a block diagram illustrating hardware elements of the system 100 of FIG. 1, in accordance with an embodiment. The system 100 may be implemented using one or more servers, which may be referred to as server. The system 100 may include a processing module 402, a memory module 404, an input/output module 408, a display module 410, a communication interface 412 and a bus 414 interconnecting all the modules of the system 100.

The processing module 402 is implemented in the form of one or more processors and may be implemented as appropriate in hardware, computer executable instructions, firmware, or combinations thereof. Computer-executable instruction or firmware implementations of the processing module 402 may include computer-executable or machine-executable instructions written in any suitable programming language to perform the various functions described.

The memory module 404 may include a permanent memory such as hard disk drive, may be configured to store data, and executable program instructions that are implemented by the processing module 402. The memory module 404 may be implemented in the form of a primary and a secondary memory. The memory module 404 may store additional data and program instructions that are loadable and executable on the processing module 402, as well as data generated during the execution of these programs. Further, the memory module 404 may be a volatile memory, such as a random access memory and/or a disk drive, or a non-volatile memory. The memory module 404 may comprise of removable memory such as a Compact Flash card, Memory Stick, Smart Media, Multimedia Card, Secure Digital memory, or any other memory storage that exists currently or may exist in the future. The memory module 402 may store the plurality of algorithms useful for classifying the numerical quantities. The plurality of algorithms may be training algorithm, labelling algorithm, among others The input/output module 408 may provide an interface for input devices such as computing devices, keypad, touch screen, mouse, and stylus among other input devices; and output devices such as speakers, printer, and additional displays, among others. The input/output module 408 may be used to receive data or send data through the communication interface 412.

Liquid Crystal Displays (OLCD) or any other type of display currently existing or which may exist in the future.

The communication interface 412 may include a modem, a network interface card (such as Ethernet card), a communication port, and a Personal Computer Memory Card International Association (PCMCIA) slot, among others. The communication interface 412 may include devices supporting both wired and wireless protocols. Data in the form of electronic, electromagnetic, optical, among other signals may be transferred via the communication interface 412.

It should be understood that the capabilities of the invention described in the present disclosure and elements shown in the figures may be implemented in various forms of hardware, firmware, software, recordable medium or combinations thereof.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus, the scope of the invention should be determined by the appended claims and their legal equivalents rather than by the examples given.

What is claimed is:

1. A computerized method of training a computer executed model for recognizing numerical quantities, the method carried out by one of more processors, the method comprising:
receiving, as input, atleast one unit expression;
searching for numeric values and the unit expression in a text corpus, the text corpus comprising sets of words and frequency of occurrence of each of the sets, the search resulting in identification of sets that comprise a combination of a numeric value and the unit expression;
generating sentences from the text corpus by applying the identified sets as input;
generating a training dataset by auto labelling in the generated sentences based on the numeric value and the unit expression; and
training the model by providing input based on the training dataset.

2. The method of claim 1, further comprising:
evaluating performance of the model using a validation dataset;
obtaining sentence generation feedback based on the evaluation; and
applying the sentence generation feedback for tuning generation of the sentences from the text corpus.

3. The method of claim 1, further comprising:
evaluating performance of the model using a validation dataset;
obtaining training module feedback based on the evaluation; and
applying the training module feedback for tuning training of the model.

4. The method of claim 1, wherein the sets of words are sets of bigrams.

5. The method of claim 1, wherein generating sentences from the text corpus comprises identifying, based on the text corpus, words that appear before and after each of the words in the identified sets.

6. The method of claim 5, wherein each of the identified sets comprises two words, wherein generating the sentences comprises identifying, words that appear before a first of the two words and words that appear after a second of the two words.

7. The method of claim 5, wherein words in the identified set are adjacent to each other in the sentence formed based on the identified set.

8. The method of claim 1, comprises receiving a plurality of unit expressions as input, wherein each of the identified sets comprise a combination of a numeric value and any one of the unit expressions.

9. A computerized system for training a computer executed model for recognizing numerical quantities, the system comprising one or more processors configured to:
receive, as input, atleast one unit expression;
search for numeric values and the unit expression in a text corpus, the text corpus comprising sets of words and frequency of occurrence of each of the sets, the search resulting in identification of sets that comprise a combination of a numeric value and the unit expression;
generate sentences from the text corpus by applying the identified sets as input;
generate a training dataset by auto labelling in the generated sentences based on the numeric value and the unit expression; and
train the model by providing input based on the training dataset.

10. The system of claim 9, wherein the one or more processors are further configured to:
evaluate performance of the model using a validation dataset;
obtain sentence generation feedback based on the evaluation; and
apply the sentence generation feedback for tuning generation of the sentences from the text corpus.

11. The system of claim 9, wherein the sets of words are sets of bigrams.

12. The system of claim 9, wherein the one or more processors are configured to generate sentences from the text corpus by identifying, based on the text corpus, words that appear before and after each of the words in the identified sets.

13. The system of claim 12, wherein words in the identified set are adjacent to each other in the sentence formed based on the identified set.

14. The system of claim 9, wherein the one or more processors are configured to receive a plurality of unit expressions as input, wherein each of the identified sets comprise a combination of a numeric value and any one of the unit expressions.

* * * * *